April 13, 1965  W. C. MARTIN, JR., ETAL  3,177,565
SPRING INSERTION
Filed Feb. 11, 1963
FIG. 1
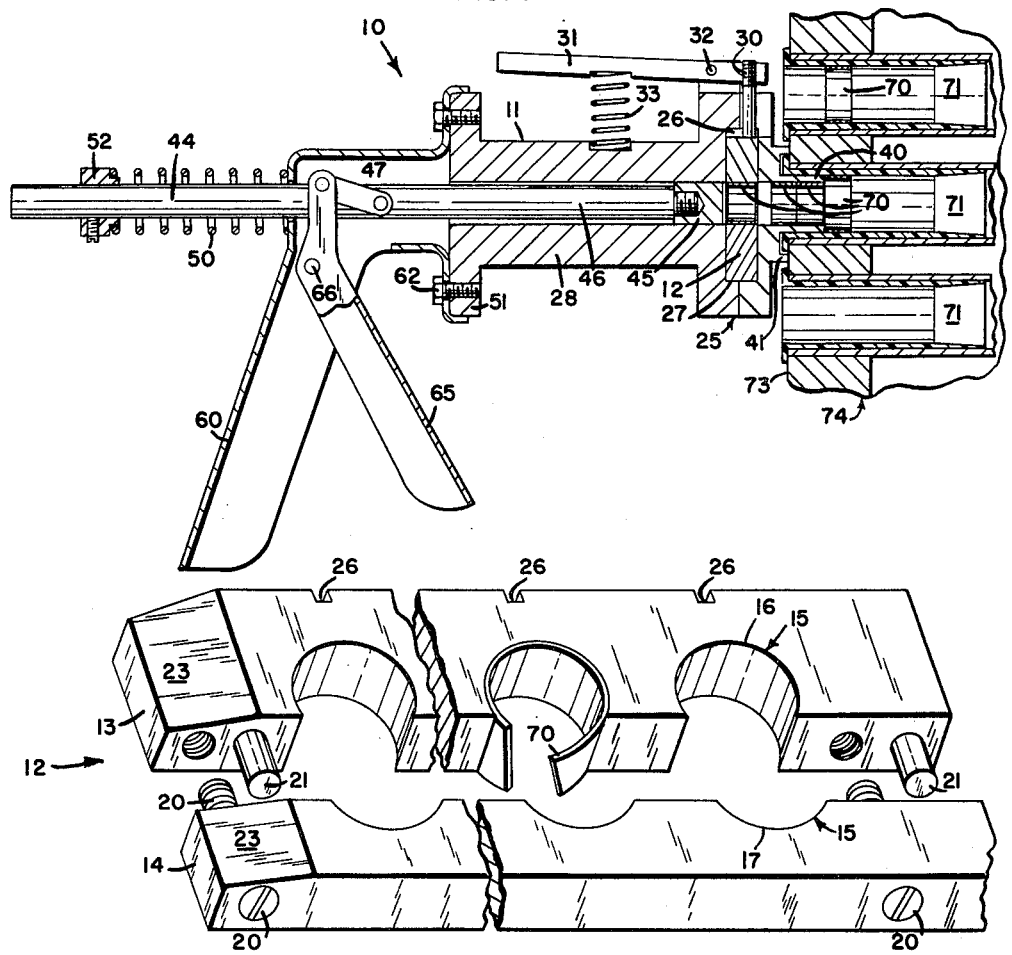
FIG. 2
FIG. 3
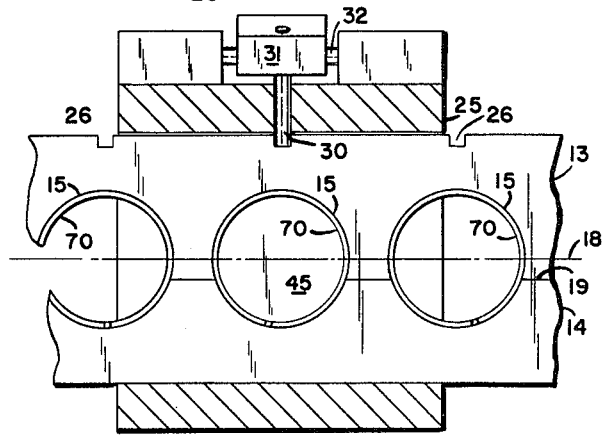
INVENTORS.
WILLIAM C. MARTIN, JR.
ROBERT K. NELSON.
BY Frank N. Decker Jr.
ATTORNEY.

3,177,565
SPRING INSERTION
William C. Martin, Jr., Syracuse, and Robert K. Nelson, North Syracuse, N.Y., assignors to Carrier Corporation, Syracuse, N.Y., a corporation of Delaware
Filed Feb. 11, 1963, Ser. No. 257,687
2 Claims. (Cl. 29—202)

This invention relates to positioning means, more particularly to means implementing the positioning of a spring member which must be prestressed before location in an insulating sleeve in a heat exchanger.

When flexible walled tube inserts or lines are inserted into the open ends of heat exchange tubes in a heat exchanger, the inserts may be secured in position by inserting an expansible spring clip within each insert, with the clip exerting an outward pressure on the insert to expand it against the inner wall of the heat exchange tube in which it is inserted. The spring clip must first be compressed, then positioned with a reasonable amount of precision within the insert while maintaining the compressive forces on the springs. Thereafter the compressive forces must be released to permit the spring to exert its desired distending force on the side walls of the tube. In a production situation, or in a maintenance situation where a large number of spring clips must be positioned in a relatively short period of time so as to make the use of spring clips economically feasible, some means must be devised serving to implement relatively rapid spring clip stressing, insertion, and location at a desired position.

It is accordingly an object of this invention to provide improved means implementing the positioning of a biasing spring member in a heat exchange tube assembly.

It is also an object of the invention to provide improved means implementing the prestressing of expansible spring clip.

These and other objects of the invention which will become hereafter apparent are achieved in the illustrated embodiment thereof by providing a novel gun having means for receiving and orienting the springs to be inserted with respect to a reciprocally mounted ram which is moved by a spring biased push rod to expel the prestressed spring from the gun. The point of delivery of the spring is defined by a muzzle at the end of the gun.

The novel gun member may be provided with a magazine to expel the prestressed springs from a spring retaining recess magazine, if desired, and deliver them to a desired position. The spring retaining recesses are arranged one adjacent the other with their axes lying along a common line. The line of cleavage of the magazine is eccentric with respect to this line running through the axes, so that when the magazine is separated along its line of clevage, the spring retaining recesses in one of the magazine segments will be off center with respect to the center of the spring to be positioned therein, encompassing a relatively larger part of the circumferential surface of each spring positoned therein than that encompassed by the recesses in the other magazine part. The larger recess forms preliminary spring biasing means, and the smaller recess forms final spring biasing means. The application of simple digital pressure suffices for insertion of the spring in the larger preliminary spring biasing recess, and the assembly of the magazine segments results in the spring being biased to its ultimate prestressed condition by the action of final biasing recess on the portion of the spring received therein.

The specific details of a preferred embodiment of the invention, and their mode of functioning, will become apparent from the following description and the accompanying drawing wherein:

FIGURE 1 is a cross-sectional view of the novel gun and split magazine showing the muzzle of the gun in position inserting a split ring into a tube insert in a heat exchanger;

FIGURE 2 is a prespective view of the magazine separated for loading; and

FIGURE 3 is a cross-sectional view through the novel gun of FIGURE 1 showing the magazine guide and indexing means.

Referring now more particularly to the drawing, like numerals in the various figures will be employed to designate like parts.

As best senn in FIGURE 1 the novel spring positioning means 10 comprises a gun 11 which may be provided with a magazine 12. Magazine guide block 25, as best seen in FIGURE 1, is formed with a rectangular breech or passageway 27 at right angles to the axis of barrel 28 of the gun 11. Indexing pin 30 extends into the rectangular magazine passage 27. The indexing pin 30 is of a dimension such that it may enter indexing slot 26 of the magazine 12. The indexing pin 30 is coupled to lever 31, at an end of said lever close to fulcrum or pivot point 32, so that upon depression of lever 31 towards barrel 28 as viewed in FIGURE 1 indexing pin 30 will be moved out of magazine passage 27. Lever biasing spring 33 positioned between the lever 31 and barrel 28 normally biases the lever upwardly with respect to the barrel so as to force indexing pin 30 into passageway 27, as viewed in FIGURE 1.

The muzzle 40 of gun 11 extends from magazine guide block 25 at the end thereof opposite to that of its point of connection to barrel 28. Collar 41 is secured about muzzle 40 for a purpose to be made hereafter more apparent. It will be understood by those skilled in the art that muzzle 40 is formed with an aperture of a diameter equal to that of the prestressed springs 70 in the magazine 12, such as to permit ram 45 to extend through the muzzle 40.

Ram 45 is coupled to push rod 46 which in turn has linkage 47 secured to center portion of rod 46. Ram 45 and rod 46 are mounted for reciprocal movement in barrel 28. Spring 50 is arranged about end 44 of push rod 46. One end of spring 50 bears against handle 60, and the other end of spring 50 bears against a collar 52 fixed on push rod 46. Handle 60, shown as fabricated of sheet metal, is secured to collar 51 by sheet metal fasteners 62. Trigger 65 pivoted at 66 to handle 60 is connected to push rod 46 by linkage 47. Magazine assembly 12 may be omitted, if desired, and instead a suitable breech provided in gun 11 for manual insertion of springs 70 therein.

In use, the aforesaid gun 11 and magazine 12 are employed as positioning means to implement the location of a prestressed spring member in operative position.

Magazine 12 as best seen in FIGURES 2 and 3 is formed of two separable segments 13 and 14 having spring retaining recesses 15 extending between both segments. Recess 15 is formed with a preliminary spring biasing portion 16 in magazine segment 13, and a final spring biasing portion 17 in magazine segment 14. Recesses 15, as viewed in the assembled magazine seen in FIGURE 3, are circular in cross-section with their centers aligned along a common recessed centerline 18. The line of cleavage 19 of the magazine is spaced from the centerline 18 of recesses 15 so that preliminary spring biasing portion 16 is of a larger peripheral area than final spring biasing portion 17, as best seen in FIGURE 2. The magazine is maintained in assembled relationship by means of tie down screws 20, and aligning pins 21 may be provided to insure proper relative positioning of the magazine segments. One end of the magazine may be beveled at 23 as viewed in FIGURE 2 so as to implement insertion of the magazine within magazine guide 25, as will become hereafter apparent.

Indexing slots 26 are arranged at spaced intervals along one edge of the magazine 12 for indexing the magazine in the passageway 27 in correct alignment with ram 45 and muzzle 40.

The magazine 12 is opened as viewed in FIGURE 2, and spring elements 70 are manually inserted into preliminary spring biasing portion 16 of segment 13. It will be observed that the force required to insert these springs into this preliminary spring biasing portion 16 is relatively small as compared to the stresses required to bend the spring to a position such as necessary for insertion into operative position. Final stressing of springs 70 is accomplished by conjoining the magazine segments 13 and 14. The final spring biasing portion 17 of segment 14 is aligned with preliminary spring biasing portion 16. Forcing the segments together by insertion of tie down screws 20 results in springs 70 being prestressed to a desired configuration implementing their insertion into operative position.

Magazine 12 is then fed into passageway 27 of guide block 25 after initially depressing lever 31 so as to enable indexing pin 30 to ride over the top surface of magazine 12, as viewed in FIGURE 3. Magazine 12 is fed along passage 27 until the indexing pin 30 drops into indexing slot 26.

Thereafter muzzle 40 is inserted into the tubular insert 71, or the like, into which the spring is to be placed, and trigger 65 is depressed causing linkage 47 to force push rod 46 forwardly so that ram 45 pushes the prestressed spring member through muzzle 40 into a predetermined desired position in the tubular insert.

As soon as the spring leaves the mouth of muzzle 40, it expands against the side walls of the tubular insert into which it has been inserted causing the insert to distend within the limits of its elasticity against the inner wall of heat exchange tube 72 into which tubular insert 71 is prepositioned, and the muzzle 40 is removed from the tube. Thereafter, lever 31 is again depressed to release indexing pin 30 from indexing slot 26, permitting the magazine 12 to be further slid along passageway 27. The magazine 12 is slid until the indexing pin can enter the next indexing slot 26 at which time another spring is aligned for insertion into a tube.

Depending on the length of collar 41, in comparison with the length of muzzle 40, point of delivery of the springs may be varied. The novel positioning means is simple in production and maintenance, and subject to ready portability.

By the use of the novel spring positioning means, springs such as split rings may be employed to secure a flexible walled tubular insert 71, such as a Teflon tube, in a heat exchange tube 72 such as may be used in the generator section of an absorption refrigeration machine. The muzzle 40 is inserted into the tube a distance limited by the length of collar 41, which abuts against the tube sheet 73 of heat exchanger 74.

It will be understood by those skilled in the art that the ram may be mechanically connected as to cause it to discharge the spring clips from the muzzle, and not retaining one or more spring clips in the muzzle as shown, without departing from the scope of the invention.

It will further be apparent that the apparatus may be provided with a safety release such, for example, as a pin at the collar 41 which is depressed only by abutting the collar against a member where the spring is to be positioned, with the pin spring loaded and coupled to a ram release pin to free the ram for spring ejection only when the gun is in operative position, within the scope of the invention.

The above description has been given by way of illustration and may be otherwise embodied within the scope of the appended claims.

We claim:

1. An apparatus for assembling and positioning a split spring member in a desired location comprising: a gun-like member adapted to be held in the user's hand, said gun-like member having a breach formed therein for receiving a spring to be positioned, a muzzle adapted to be inserted at predetermined distance into the desired location in which said spring is to be inserted for discharging said spring member in a prestressed condition at said desired location, a barrel extending along an axis of said breach to said muzzle, ram means reciprocably mounted in said gun member for motion through said barrel, a magazine for holding a plurality of said spring members, said magazine comprising a pair of segments having a plurality of spring retaining recesses therein of a shape and a size corresponding to the desired prestressed shape and size of said spring members, a portion of each said spring retaining recesses being disposed in each of said pair of magazine segments to facilitate positioning of said spring member in said magazine, said magazine being transversely received in the body of said gun-like member adjacent the breach formed therein so that one of said spring members is adapted to be positioned in alignment with and between said breach and said ram, and manipulator means for moving said ram through aligned aperture in said magazine and through said barrel so that said ram engages a spring-like member in the aligned aperture of said magazine and forces said spring member through said barrel and out said muzzle at said desired location.

2. An apparatus for assembling and positioning an annular split spring member in a tubular insert for expanding and retaining said tubular insert in a desired position in a heat exchange tube, said apparatus comprising: a gun-like member adapted to be held in a user's hand and having a breach formed therein for receiving said annular spring member, a muzzle adapted to be inserted a predetermined distance into said tubular insert for discharging said spring member in a prestressed condition at a desired location in said tubular insert, a barrel extending along an axis from the breach formed in said member to said muzzle, ram means reciprocably mounted in said gun member for motion through said barrel, a magazine for holding a plurality of said spring members comprising a pair of segments having a plurality of spring retaining recesses therein of a shape and a size corresponding to the desired prestressed shape and size of said spring members when said segments are conjoined, one of said segments having a plurality of preliminary biasing recesses for receiving said springs, the other of said segments of said magazine having a plurality of final biasing recesses in which another part of the spring is received, said magazine segments being conjoinable with each other so that the preliminary biasing recesses and the final biasing recesses cooperate in prestressing said springs to an ultimate desired prestressed orientation by conjunction of said segments, said magazine being transversely received in said gun-like member adjacent said breach so that one of said spring members is adapted to lie in alignment with and between said breach and said ram, and manipulator means for moving said ram through aligned aperture in said magazine and through said barrel so that said ram engages a spring member in said aligned aperture of said magazine and forces said spring member through said barrel and out said muzzle at said desired location in said tubular insert.

References Cited by the Examiner

UNITED STATES PATENTS

| | | | |
|---|---|---|---|
| 2,743,512 | 5/56 | Moyer | 29—202 |
| 2,840,892 | 7/58 | Erdmann | 29—211 |
| 3,106,770 | 10/63 | Grupp | 29—212 |

WHITMORE A. WILTZ, *Primary Examiner.*

THOMAS H. EAGER, *Examiner.*